Patented June 29, 1948

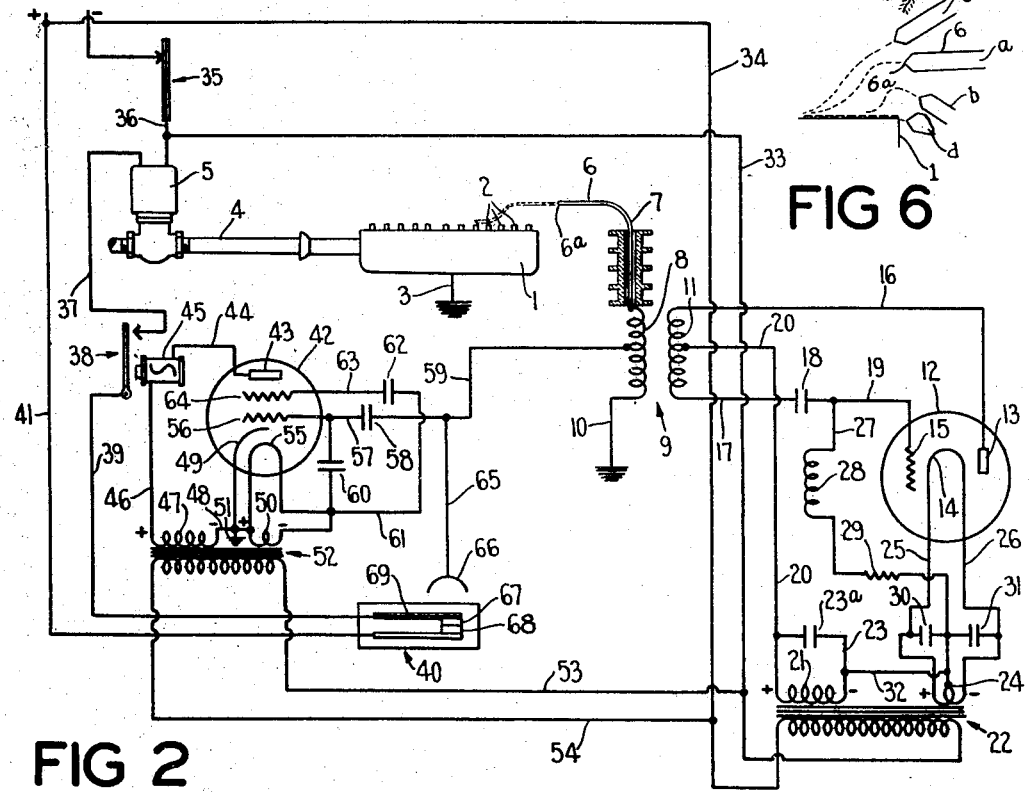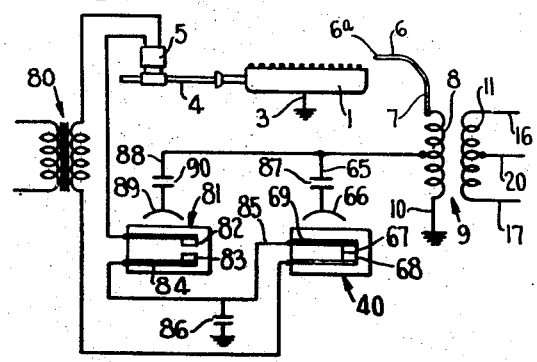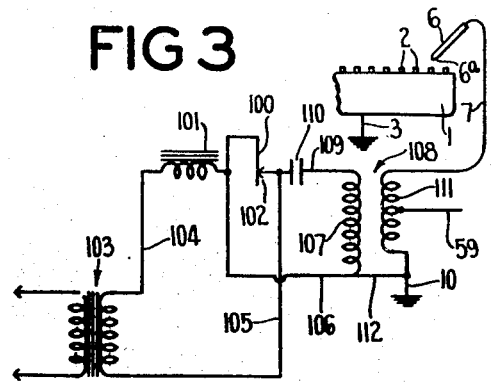

2,444,239

UNITED STATES PATENT OFFICE 2,444,239

HIGH-FREQUENCY SPARK IGNITER MEANS FOR BURNERS

Fred B. Aubert, Grosse Pointe, and De Loss E. Scott, Detroit, Mich.; said Scott assignor to said Aubert.

Application March 10, 1943, Serial No. 478,600

9 Claims. (Cl. 158—99)

This invention relates to new and useful improvements in fuel burner apparatus, and more particularly to ignition and controlling means for the apparatus.

An object of the invention is to provide means to produce electric spark streams having highly efficient characteristics for igniting fluid fuel.

Another object is to provide means to produce flowing spark streams of such value from a fuel igniting electrode that the electrode may be readily handled.

Another object is to provide ignition spark streams having a rapidity of discharge in accordance with the inflammability of the fuel to be ignited.

Another object is to provide means for controlling the operation of a fluid fuel burner in accordance with certain characteristics of the fuel igniting spark.

Another object is to provide means for assuring proper adjustment of the fuel igniting electrode with respect to the fuel to be ignited.

The invention consists in the novel spark producing means and in the controlling means cooperable therewith to be more fully described hereinafter and the novelty of which will be particularly pointed out and distinctly claimed.

In the accompanying drawings to be taken as a part of this specification, there are fully and clearly illustrated several preferred embodiments and modifications of the invention, in which drawings Figure 1 is a diagrammatic view of a burner apparatus showing a wiring diagram of the control and ignition means;

Figure 2 is a diagrammatic view showing a wiring diagram of an alternate form of burner controlling means;

Figure 3 is a diagrammatic view showing a wiring diagram of a modified form of ignition means;

Figure 4 is a view of a normally closed thermostatic switch for use in the control apparatus;

Figure 5 is a view of a normally open thermostatic switch for use in the control apparatus, and Figure 6 is a detail view showing various paths and forms of spark discharge in accordance with the relation of the electrode to the burner.

Referring to the drawings by characters of reference, there is shown in Fig. 1 a fluid fuel burner 1, such as a gas burner having fuel mixture discharge jets 2 which is electrically connected to ground, as by a conductor 3. The burner 1 is supplied with fuel by a pipe or conduit 4 having an electrically operated means 5, such as a solenoid valve, controlling the supply of fuel. Cooperable with the burner 1 there is a spark or ignition electrode 6 which is adjustable to position its discharge terminal 6ᵃ relative to the burner. The electrode 6 preferably has its end portion and terminal 6ᵃ directed substantially parallel to the plane of the burner 1 and transverse to the direction of fuel discharge, as shown in Fig. 1 and at $a$ in Fig. 6. It is also preferably positioned laterally outward of the flame area. The electrode 6 is carried by a conductor 7, preferably a flexible member, electrically connected to one terminal of the secondary coil 8 of a radio frequency transformer 9, the other terminal of the coil 8 being connected to ground by a conductor 10. The transformer 9 is an ignition transformer having a high ratio of voltage increase for stepping up the voltage from the primary coil 11 to the secondary coil 8 in the ratio of say one to ten.

Current is supplied to the coil 11 from an oscillating electric circuit having an electron tube 12 with a controlling network. The tube 12 is preferably of the three-element type having a plate or anode 13, a filament cathode 14 and a control grid 15. The plate 13 is connected by a conductor 16 to the terminal of the primary coil 11 corresponding to the terminal connection of the conductor 7 to the coil 8. At spaced turns from the connection of the conductor 16 to the coil 11, such as at the other end of the primary coil, a conductor 17 connects to one side of a grid controlling condenser 18, a conductor 19 connecting the other side of condenser 18 to the grid 15. Connected to an intermediate turn of the coil 11 there is a conductor 20 which is connected to one terminal of a current supply means 21, such as a secondary coil of a transformer 22 having its primary connected to the customary low voltage, low frequency, domestic supply, such as a 110 v. 60 c. current source. Extending from the other terminal of the coil 21 there is a conductor 23 between which, and the conductor 20, there is a condenser 23ᵃ having a value to by-pass the frequency at which the circuit is to be operated. The transformer 22 also has a secondary coil 24 providing the heating current for the filament 14 and connected thereto by conductors 25, 26. From the grid conductor 19 a leakage conductor 27 connects to the mid-tap of the secondary coil 24 and has therein a radio frequency choke coil 28 in series with a grid leak resistance 29. Connected between the leakage conductor 27 and the filament conductors 25, 26, there are balancing condensers 30, 31 which are positioned on the filament current supply side of the choke coil 28 and resistor 29. A conductor 32 connects the center tap of coil 24 to the conductor 23 of coil 21. The values of the condensers 18, 30 and 31 and of the resistor 29 is such that the tube 12 is oscillated at predetermined radio frequency of hundreds of kilocycles, a frequency of say 800 kilocycles being highly satisfactory for certain fuels, such as heavy oils, which are to be ignited. The transformer 22 has its primary coil supplied with current by conductors 33, 34 controlled by a switch 35, such as a room thermostat. Because of the extremely high voltage and frequency of the current supplied by the coil 8 to the conductor 7, the conductor 7 and electrode 6 must not have any abrupt change in direction, as any change in direction which is more than a gradual deviation from a straight line between the coil 8 and the desired point 6a of spark discharge at the electrode 6 will result in a spark discharge to atmosphere at the point of abrupt change in direction.

The switch 35 also preferably controls the solenoid valve 5, being connected thereto by a conductor 36. From the valve 5 a lead wire 37 connects to one terminal of a relay switch 38 having its other terminal connected by a lead wire 39 to one terminal of a gas tube warp switch 40 which is normally closed. From the other terminal of the switch 40 a lead wire 41 is connected to the lead wire 34. The relay switch 38 is controlled by an electron tube 42, preferably of the gaseous type having a controlling network and having its plate or anode 43 connected by a conductor 44 to the relay operating coil 45 of the switch 38. The coil 45 is supplied with current by a conductor 46 leading from one terminal of a transformer secondary coil 47, which has its other terminal connected by a conductor 48 to the tube cathode 49, and to one terminal of filament current supplying coil 50. The conductor 48 is grounded as at 51. The coils 47 and 50 are supplied with current by a transformer 52 having its primary connected by conductors 53, 54 to the conductors 33, 34 respectively, so that the transformer is controlled by the switch 35. The filament or heating element 55 of tube 42 is connected across the transformer coil 50. From the control grid 56 a grid conductor 57 connects to one side of a grid controlling condenser 58 having its other side connected by a conductor 59 to an intermediate tap of the transformer secondary coil 8. A balancing condenser 60 is connected between the grid conductor 57 and the other terminal of the filament current supplying coil 50. Also connected to this other terminal of the coil 50 there is a conductor 61 which leads to one side of a condenser 62 having its other side connected by a lead wire 63 to the screen grid 64 of tube 42. The values of the condensers 58 and 60 is such that the control grid 56 is sufficiently negative to block the tube 42 for all voltages of the secondary coil 8 which are less than the desired voltage at the spark terminal 6a of the electrode 6, such as will occur when the conductor 7 or electrode 6 are shorted or the electrode terminal 6a is positioned too close to the burner 1 as indicated at d in Fig. 6.

Connected to the conductor 59 there is a conductor 65 terminating in a space discharge or gas ionizing electrode 66 cooperable with the gas tube warp switch 40. The switch 40 is preferably a sealed glass envelope charged with an inert gas or combination of gases at a predetermined pressure, such as in the Sheldon type FS4-NA gas tube warp switch used for fluorescent tube excitation. The switch has normally closed contacts 67, 68, the movable contact 67 being carried by a bimetal blade or strip 69 which is connected to ground equivalent, namely the grounded side of the current supply. The connection of the conductor 59 to the coil 8 is such relative to the gap between the electrode 66 and the strip 69 and to the gas and the pressure of the gas in the envelope that the gas in the envelope will not be sufficiently ionized to produce sufficient heat to open the switch 40 at voltages below a desired maximum voltage at the point of spark discharge from the electrode 6. This desired maximum voltage is one resulting from adjustment of the spark electrode 6 relative to the burner 1 such that there is no bunched discharge of spark streams from the terminal 6a to the burner 1, as is occurring at electrode e, Fig. 6.

The operation of the apparatus in Fig. 1 is as follows: When the switch 35 is closed as shown, the filament 14 is heated and current flow from the anode 13 to the cathode filament 14 is controlled by the grid 15. Due to the design of coil 11, the radio frequency voltage supplied by the tube 12 to the coil 11 is of a high value. The spacing of the coils 11 and 8 and the ratio of turns, which may be one to ten, is such that a radio frequency voltage at upwards of 50,000 volts at micro-amperage, preferably less than one milli-ampere is supplied by the coil 8 to the conductor 7. This will result in the discharge to atmosphere of flowing spark streams at the discharge end 6a of the electrode 6. By providing a transformer 9 which will deliver to the electrode 6 a radio frequency voltage of say 250,000 volts, the discharging spark streams will be of considerable length, such that when the burner 1 is positioned intermediate the length of the discharging spark streams, the greater part of the streams will be bunched into a stream path. By positioning the burner 1 at a distance greater say than half the length of the spark streams from the electrode 6, the bunched stream path will have its position of impingement on the burner 1 continually changing over a considerable area, thereby subjecting different portions of the supplied fuel to the impingement of the spark streams. Otherwise stated, the terminal discharge portion or tip 6a of the electrode 6 is positioned a greater distance away from the burner than the air gap distance or equivalent dielectric "distance" which will be bridged by the current at the above frequency and voltage in a direction laterally of the conductor 7, because at the high frequency and voltage employed, the current is compelled to follow gradual arcs and straight line courses, and can not be turned at a sharp angle. In the positions a, b and c of Fig. 6, the bunched stream impingement will occur. However, the position a is preferable because, as will be noted, the bunched spark stream sweeps across the discharging gas streams from a plurality of vents or jets and at different distances from the burner so that various types of fuel are all readily ignited. The rapidity of discharge of the spark streams due to the high frequency and the force at which the streams are discharging due to the high voltage causes an internal heating of the fuel which is impinged, thereby altering its characteristics so that the fuel is rendered more highly inflammable and is quickly ignited by the bunched spark streams. When the radio frequency voltage in the coil 8 is at a value indicating that the electrode 6 is sufficiently spaced from the burner 1 for the continual changing of the position of impingement of the bunched spark streams thereon, then the high frequency voltage supplied by the conductor 59 to the condenser 58 will render the control grid 56 sufficiently more positive or less negative so that current will flow from the anode 43 to the cathode 49, thereby to energize the relay coil 45 and close the relay switch 38. This closure of switch 38 will establish a circuit through the solenoid valve 5 to supply fuel to the burner 1, the fuel mixture discharging from the jets 2 being ignited by the bunched spark streams from the electrode 6 as above described. If during the discharge of the bunched spark streams from the electrode 6 to the burner 1 or at any other time, the electrode 6 is spaced away from the burner 1 such that bunched spark streams do not impinge thereon, as is indicated in position e, Fig. 6, then the increased resistance to the current supplied by the coil 8 will result in an increased voltage which will be supplied by the conductor 65 to the gas ionizing electrode 66. When the radio frequency voltage at the ionizing electrode 66 indicates that the bunched spark streams will not impinge the burner 1, then the voltage and frequency will create sufficient heat by ionization of gas in the tube 40, the heat being concentrated on the bimetal strip 69, to cause the strip 69 to warp and open the circuit of the valve 5 at the contacts 67, 68. The circuit of the solenoid valve 5 will therefore remain broken at the switch 40 until the electrode 6 is adjusted in proper relation to the burner 1.

Referring to Figure 2, the control apparatus employs a gas tube warp switch in lieu of the electron tube 42 of Fig. 1. In this control circuit, the solenoid valve 5 preferably has a low voltage coil, for say 24 volt operation, supplied by a step down transformer 80. In series circuit with the coil of valve 5 and the gas tube warp switch 40, there is a gas tube warp switch 81 having contacts similar to the switch 40 but having its contacts 82, 83 in normally open position. The contact 83 is carried by a bimetal blade or strip 84 which is connected by a conductor 85 to the bimetal blade 69 of switch 40. The conductor 85 is connected through a condenser 86 to ground. In this circuit the conductor 65 for the gas ionizing electrode 66 contains a condenser 87 having a capacity of say .001 microfarad. The conductor 59 which supplies the electrode 66 from the coil 8 also supplies a conductor 88 leading to a gas ionizing electrode 89 for energizing the switch 81. A condenser 90 having a capacity of say .01 microfarad is interposed in the conductor 88.

The operation of this apparatus of Fig. 2 is as follows. When the radio frequency oscillating circuit for the ignition transformer 9 is closed by the switch 35, the high voltage radio frequency supplied by the coil 8 will, when the voltage indicates a bunched discharge of spark streams from the electrode 6 to the burner 1, as described above with respect to Figs. 1 and 6, positions a, b and c, cause the tube switch 81 to have its gas ionized sufficiently to generate heat at the blade 84 which will close the contacts 82, 83, thereby energizing the solenoid valve 5 to supply fuel to the burner 1. The capacity of the condenser 87 is such that the voltage which will ionize the gas in the switch 81 will not be transmitted sufficiently to the switch 40 to actuate it as above described with respect the Fig. 1. When the position of the electrode 6 is changed as above described with respect to Figs. 1 and 6, to the position e, so that bunched spark streams will not impinge on the burner 1, then the switch 40 will be energized as above described by reason of the capacity of the condenser 87, so that the blade 69 will be warped to open the circuit of valve 5 at the contacts 67, 68, thereby breaking the circuit of the valve 5. However, if the electrode 6 is positioned too close to the burner 1, as at position d, Fig. 6, then the frequency and voltage applied to switch 81 will not ionize the gas sufficiently to close contacts 82, 83.

In Figure 3 there is shown a magnetic vibrator circuit for supplying an extremely high frequency current to the electrode 6 and which is capable of use with either the control circuit of Fig. 1 or Fig. 2. In this vibrator circuit there is an armature 100 operable by an electromagnet 101 and having a contact 102 normally engaged by the armature 100. The vibrator is supplied with current from a transformer 103, for example, having its circuit controlled by a switch such as the switch 35. The secondary coil of the transformer has one terminal connected by a lead wire 104 to the coil of magnet 101 and the armature 100 and has its other terminal connected by a lead wire 105 to the contact 102. The armature 100 is connected by a lead wire 106 to one terminal of the primary coil 107 of a radio frequency step up ignition transformer 108. From the other terminal of the coil 107, a lead wire 109 connects through a condenser 110 to the contact 102. The secondary coil 111 of the transformer 8 is grounded by the lead wire 10 and may be coupled to the primary 107 by a conductor 112. The coil 111 is connected to the control conductor 59 similarly to the connection of this control conductor to the coil 8 of Figs. 1 and 2. Connected to the output end of the coil 111 is the supporting conductor 7 for the electrode 6.

The operation of the circuit of Fig. 3 is as follows: When the circuit to the transformer 103 is closed, say at switch 35, the armature 100 will be vibrated to make and break circuit at its contact 102. This pulsating or oscillating current will be supplied to the primary coil 107 which, cooperating with the condenser 110, will establish in the coil 107 an extremely high frequency oscillating current. The transformer 108, which has a high ratio of voltage increase, will supply to the electrode 7 a current of micro-amperage, preferably less than one milli-ampere, at a voltage in excess of 50,000 v. and preferably say about 250,000 v. The extremely high voltage, high frequency current in the coil 111 will function with the control tube 42 and switch 40 of Fig. 1 and with the switches 81 and 40 of Fig. 2 in the manner above described with respect to the radio frequency current supplied by the coil 8, and therefore a detailed description of this operation is not necessary.

In Figs. 4 and 5 there are shown gas tube warp switches which are respectively normally closed and normally open and which are capable of efficient usage in place of the switches 40 and 81 respectively. In Fig. 4 the sealed glass tube or envelope 120 contains switch contacts 121, 122, the contact 121 being carried by a supporting conductor 123 and the contact 122 being carried by a bimetal strip or blade conductor 124. Extending into the tube 120 adjacent the temperature responsive conductor 124 there is an electrode 125 which is so positioned that heating of the conductor 124 will move the conductor 124 away from the electrode 125. Therefore, the conductor 124 will move to and remain in a predetermined spaced position with respect to the electrode 125 at the desired operating frequency and voltage of the switch. Also extending into the tube 120 there is an electrode 126 which is spaced from and cooperable with the electrode 125 to provide the ionizing voltage and frequency for the gas in the tube 120. The electrode 126 is connected to the source of ionizing voltage and frequency and the electrode 125 is connected through a condenser to ground. The tube 120 is charged with an inert gas or combination of gases at a pressure such that the gas will be sufficiently ionized at the desired voltage and frequency of switch operation to create sufficient heat at the electrode 125 to operate the bimetal conductor 124 to open the switch contacts 121, 122.

In Fig. 5 the parts of the gas tube warp switch are the same as described in Fig. 4 except that a bimetal strip or blade conductor 130 having the reverse of the warpage of the conductor 124 upon heating is employed, that is, the blade 130 upon heating will move the contact 122 carried thereby toward the contact 121 carried by the conductor 123. Accordingly the electrode 125 which is connected through its condenser to ground is positioned on the opposite side of the electrode 130 with respect to its position in Fig. 4, so that at the desired operating voltage and frequency the bimetal conductor 130 will have moved away from the conductor 125 and will be holding the contact 122 in engagement with contact 121 with a predetermined force. It will be apparent that the electrode 126 could be external of the tube 120 while the cooperative relation of the electrode 125 and bimetal conductor 124 or 130 would be maintained. However, the operation of the gas tube warp switch is materially improved and it is more efficient by positioning the electrode 126 within the envelope or tube 120 so that it is in contact with the gas to be ionized and may be accurately positioned in desired relation to the electrode 125 or 130.

What is claimed and is desired to be secured by Letters Patent of the United States is:

1. A burner control apparatus comprising a spark electrode, means to supply to said electrode a current of voltage and frequency sufficiently high to discharge flowing streams of sparks to atmosphere, a fluid fuel burner positioned for impingement of spark streams thereon, electrically operable means for supplying fuel to said burner, a pair of series connected gas tube warp switches each having a thermal switch operating element and controlling said electrically operable means, one of said switches being normally open and the other being normally closed, a gas-ionizing electrode cooperable with said normally open switch and operable to supply thereto voltage and frequency from said supply means, means determining the voltage at said gas-ionizing electrode for closing said normally open switch and indicative of impingement of spark streams on said burner, a gas-ionizing electrode cooperable with said normally closed switch and operable to supply thereto voltage and frequency from said supply means, and means determining the voltage at said last-named electrode for opening said normally closed switch and indicative of too great a spacing of said spark electrode from said burner.

2. A burner control apparatus comprising a fluid fuel burner, a radio frequency transformer, a spark electrode supplied by said transformer and cooperable with said burner, electrically operable means controlling the supply of fuel to said burner, an electron tube having a controlling network and controlling the operation of said electrically operable means, said network having a grid controlling condenser connected to the secondary coil of said transformer to determine the minimum voltage of the current to be supplied to said electrode at which said operable means will be operated, a gas tube warp switch having a gas-ionizing electrode and operable to break the circuit of said electrically operable means, and means electrically connecting said gas-ionizing electrode to said transformer secondary coil to determine the maximum voltage of the current to be supplied to said spark electrode at which said circuit will be broken.

3. A burner control apparatus comprising a fluid fuel burner having a fuel discharging outlet and having a terminal electrode surface surrounding said outlet, a spark electrode positioned laterally outside of the path of flame from and directed across said outlet, an ignition transformer having its secondary electrically connected to said spark electrode, said transformer being so constructed and so supplied with current as to supply to said spark electrode a current of less than one milli-ampere and of at least 100,000 volts and at radio frequency, electrically operable means controlling the supply of fuel to said burner, a gas tube warp switch responsive to voltage and frequency and controlling said electrically operable means, and an electrode cooperable with and for heating the gas in said warp switch and electrically connected to an intermediate tap of said transformer secondary.

4. A burner controlling apparatus comprising a gas burner, an electric valve controlling flow of gas to said burner, a circuit for said valve, a normally closed gas tube warp switch in said circuit, a normally open gas tube warp switch in said circuit in series with said normally closed switch and said valve, a spark electrode for discharging a spark stream to said burner, a transformer operable at radio frequency and having its secondary electrically connected to said electrode, a gas ionizing electrode cooperable with said normally open switch, a condenser having one side connected to said gas electrode, a second gas ionizing electrode cooperable with said normally closed switch, a condenser having one side connected to said second gas electrode, and a conductor electrically connecting the other sides of said condensers together and to an intermediate tap of said transformer secondary, said condensers being related to the voltage at said tap and the resistance to spark discharge at said electrode thereby to determine the low limit of the voltage range at which said normally open switch will be closed and to determine the high limit of the voltage range at which said normally closed switch will be opened.

5. An electrical gas burner igniting apparatus, comprising a multi-outlet gas burner having an electrically conducting spark receiving surface surrounding a plurality of its burner outlets, a conductor terminating in a spark discharging electrode portion cooperable with and spaced by an air gap from said surface, and means to supply a current of less than one milli-ampere and at radio frequency and at a voltage of at least 100,000 volts to said conductor, electrically operable means controlling the supply of gas to said burner, and means operable to deenergize said electrically operable means upon spacing of said electrode portion closer to said surface than the distance necessary to insulate said conductor.

6. An electrical gas burner igniting apparatus, comprising a multi-outlet gas burner having an electrically conducting spark receiving surface surrounding a plurality of its burner outlets, a conductor terminating in a spark discharging electrode portion cooperable with and spaced by an air gap from said surface, and means to supply a current of less than one milli-ampere and at radio frequency and at a voltage of at least 100,000 volts to said conductor, electrically operable means controlling the supply of gas to said burner, and means operable to deenergize said electrically operable means upon spacing of said electrode portion further away from said surface than the distance from which spark streams will impinge said surface.

7. In an electrical fuel burner igniting apparatus, a fuel burner having an electrically conducting spark receiving surface, a conductor having a body portion and having a spark stream discharge portion cooperable with and spaced by an air gap from said surface, and means to supply a micro-amperage current at radio frequency and at a voltage of at least 100,000 volts to said conductor, said body portion being insulated from ground to prevent leakage and being effective to convey said current to said discharge portion, said discharge portion being spaced from said surface by a distance greater than the air gap distance necessary to insulate said body portion from ground and being spaced from said surface by a distance less than the maximum distance from which spark streams will impinge said burner surface so that the spark streams discharged from said discharge portion will seek said burner surface indiscriminately by indeterminate paths having shifting areas of impingement on said surface.

8. A burner control apparatus comprising a fuel burner having an electrically conducting spark receiving surface, electrically operable means for supplying fuel to said burner, a conductor having a body portion and having a spark stream discharge portion cooperable with and spaced by an air gap from said surface, means to supply a micro-amperage current at radio frequency and at a voltage of at least 100,000 volts to said conductor, said body portion being insulated from ground to prevent leakage and being effective to convey said curent to said discharge portion, means responsive to voltage supplied to said conductor and operable to energize said electrically operable means upon spacing of said discharge portion from said surface by a distance greater than the air gap distance necessary to insulate said body portion from ground, and means responsive to voltage supplied to said conductor and operable to de-energize said electrically operable means upon spacing of said discharge portion from said surface by a distance greater than the maximum distance from which spark streams will impinge said burner surface.

9. A burner control apparatus comprising a gas burner having an electrically grounded burner outlet surface with a plurality of burner outlets opening through said surface, electrically operable means for supplying fuel to said burner, an ignition transformer operable to radio frequency, means to supply to said transformer a high voltage micro-amperage current having a predetermined frequency of hundreds of kilocycles, a conductor having a body portion and having a spark stream discharge portion cooperable with and spaced by an air gap from said surface, said body portion leading to said discharge portion from the secondary coil of said transformer, said transformer having a ratio of voltage increase to supply current at hundreds of thousands of volts to said discharge portion, said body portion being insulated from ground to prevent leakage and being effective to convey said transformer secondary coil current to said discharge portion, means responsive to voltage supplied by said coil and operable to energize said electrically operable means upon spacing of said discharge portion from said surface by a distance greater than the air gap distance necessary to insulate said body portion from ground, and means responsive to voltage supplied by said coil and operable to de-energize said electrically operable means upon spacing of said discharge portion from said surface by a distance greater than the maximum distance from which spark streams will impinge said burner surface.

FRED B. AUBERT.
DE LOSS E. SCOTT.

REFERENCES CITED

The following references are of record in the file of this patent:

UNITED STATES PATENTS

| Number | Name | Date |
| --- | --- | --- |
| 1,501,489 | Hunt et al. | July 15, 1924 |
| 1,589,489 | Snook | June 22, 1926 |
| 1,688,864 | Fischer et al. | Oct. 23, 1928 |
| 1,728,816 | White | Sept. 17, 1929 |
| 1,755,390 | Fischer et al. | Apr. 22, 1930 |
| 1,773,014 | Seslar | Aug. 12, 1930 |
| 1,810,957 | Fraser | June 23, 1931 |
| 1,833,774 | Cronk | Nov. 24, 1931 |
| 1,924,304 | Briesky, et al. | Aug. 29, 1933 |
| 1,936,784 | Diamond | Nov. 28, 1933 |
| 1,968,930 | Cotter et al. | Aug. 7, 1934 |
| 2,154,041 | Gille | Apr. 11, 1939 |
| 2,196,442 | Maynard | Apr. 9, 1940 |
| 2,261,153 | Gieringer | Nov. 4, 1941 |

OTHER REFERENCES

Instructions for installing new style Bennett Arresters—page 7, Electric Power Equipment Co., Philadelphia, Pa., July 10, 1931, copy in Division 48.